(12) United States Patent
Dreyer

(10) Patent No.: US 11,339,604 B2
(45) Date of Patent: May 24, 2022

(54) CONTROL ARRANGEMENT FOR AN ENTRANCE SYSTEM HAVING ONE OR MORE MOVABLE DOOR MEMBERS

(71) Applicant: ASSA ABLOY ENTRANCE SYSTEMS AB, Landskrona (SE)

(72) Inventor: Roger Dreyer, Bjarred (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 161 days.

(21) Appl. No.: 16/492,497

(22) PCT Filed: Apr. 6, 2018

(86) PCT No.: PCT/EP2018/058814
§ 371 (c)(1),
(2) Date: Sep. 9, 2019

(87) PCT Pub. No.: WO2018/189042
PCT Pub. Date: Oct. 18, 2018

(65) Prior Publication Data
US 2021/0140221 A1    May 13, 2021

(30) Foreign Application Priority Data
Apr. 10, 2017  (SE) .................................... 1730102-9

(51) Int. Cl.
*E05F 15/73*    (2015.01)
*E06B 3/90*     (2006.01)
*E05F 15/603*   (2015.01)

(52) U.S. Cl.
CPC ............... *E05F 15/73* (2015.01); *E06B 3/90* (2013.01); *E05F 15/603* (2015.01);
(Continued)

(58) Field of Classification Search
None
See application file for complete search history.

(56) References Cited

U.S. PATENT DOCUMENTS 4,669,218 A * 6/1987 Kornbrekke ............ E05F 15/73
250/221
4,823,010 A * 4/1989 Kornbrekke ............ G01S 17/04
250/341.7
(Continued)

FOREIGN PATENT DOCUMENTS

DE      19900139     7/1999
DE     102005040763  3/2007
(Continued)

OTHER PUBLICATIONS

International Search Report in PCT/EP2018/058814 dated Jul. 17, 2018.
(Continued)

*Primary Examiner* — Marcus Menezes
(74) *Attorney, Agent, or Firm* — Wissing Miller LLP

(57) ABSTRACT

A control arrangement (20) for an entrance system (10) has one or more movable door members (D1 . . . Dm) and an automatic door operator (30) for causing movements of the one or more movable door members (D1 . . . Dm) between closed and open positions. The control arrangement (20) comprises a controller (32) and a plurality of sensors (S1 . . . Sn). Each sensor is connected to the controller (32) and is configured to monitor a respective zone (Z1 . . . Zn) at the entrance system (10) for presence or activity of a person or object. Each sensor (S1 . . . Sn) has an active mode and an inactive mode, wherein the sensor consumes no electric power in the inactive mode or substantially less electric power in the inactive mode than in the active mode. The controller (32) is configured to determine a current operational state of the entrance system (10) among a plurality of possible operational states, and selectively cause at least one of the sensors (S1 . . . Sn) to be in its active mode (Continued)

or in its inactive mode depending on the determined current operational state of the entrance system (10).

6 Claims, 7 Drawing Sheets

(52) U.S. Cl.
CPC ..... *E05Y 2400/44* (2013.01); *E05Y 2400/452* (2013.01); *E05Y 2900/132* (2013.01)

(56) References Cited

U.S. PATENT DOCUMENTS

| | | | | |
|---|---|---|---|---|
| 4,866,881 | A * | 9/1989 | Morrow | G01S 13/862 |
| | | | | 49/25 |
| 5,149,921 | A * | 9/1992 | Picado | B66B 13/26 |
| | | | | 187/317 |
| 5,963,000 | A * | 10/1999 | Tsutsumi | E05F 15/73 |
| | | | | 250/221 |
| 6,255,791 | B1 * | 7/2001 | Ariav | G01S 15/04 |
| | | | | 318/282 |
| 8,225,458 | B1 * | 7/2012 | Hoffberg | E05F 3/222 |
| | | | | 16/49 |
| 8,510,990 | B2 * | 8/2013 | Agam | G01S 15/88 |
| | | | | 49/28 |
| 2001/0030606 | A1 | 10/2001 | Jaffe | |
| 2002/0036476 | A1 | 3/2002 | Zengguang | |
| 2008/0110093 | A1 | 5/2008 | Liles | |
| 2011/0276234 | A1 * | 11/2011 | Van Gastel | E05B 81/78 |
| | | | | 701/49 |
| 2016/0040469 | A1 * | 2/2016 | Lietz | E06B 9/82 |
| | | | | 49/13 |
| 2018/0238099 | A1 * | 8/2018 | Schatz | E05F 15/40 |

FOREIGN PATENT DOCUMENTS

| | | |
|---|---|---|
| EP | 0144882 | 6/1985 |
| EP | 0290944 | 11/1988 |
| EP | 0789127 | 8/1997 |
| EP | 1243943 | 9/2002 |
| EP | 1801341 | 6/2007 |
| EP | 2101026 | 9/2009 |
| WO | 9308356 | 4/1993 |

OTHER PUBLICATIONS

International Type Search Report in Swedish Application 1730102-9 dated Dec. 9, 2017.

* cited by examiner

A method of operating an entrance system:

300

310
Provide a plurality of sensors S1...Sn, each sensor being configured to monitor a respective zone Z1...Zn at the entrance system 10 for presence or activity of a person or object

320
Determine a current operational state of the entrance system 10 among a plurality of possible operational states

330
Selectively cause at least one of the sensors S1...Sn to be in an active mode (operating mode) or in an inactive mode (idle mode) depending on the determined current operational state of the entrance system 10, wherein the sensor consumes no electric power in the inactive mode or substantially less electric power in the inactive mode than in the active mode

*Fig 3*

| Sensor | Type | Closed | Opening | Open | Closing |
|---|---|---|---|---|---|
| S5 (Z5) | Inner | ON | OFF | ON | ON |
| S6 (Z6) | Outer | ON | OFF | ON | ON |
| S3 (Z3) | Presence 1 | OFF | OFF | OFF | ON |
| S4 (Z4) | Presence 2 | OFF | OFF | OFF | ON |
| S1 (Z1) | Side 1 | OFF | ON | OFF | OFF |
| S2 (Z2) | Side 2 | OFF | ON | OFF | OFF |

Operational states of entrance system 410

| Type | Closed | Opening | Open | Closing |
|---|---|---|---|---|
| Inner | ON | OFF | ON | ON |
| Outer | ON | OFF | ON | ON |
| Presence 1 | OFF | ON | OFF | OFF |
| Presence 2 | OFF | OFF | OFF | ON |

Operational states of entrance system 510

| Sensor | Type | No rotation | Start rotation | Rotation | End rotation |
|---|---|---|---|---|---|
| S5 (Z5) | Inner | ON | OFF | OFF | ON |
| S6 (Z6) | Outer | ON | OFF | OFF | ON |
| S1 (Z1) | Presence 1 | OFF | ON | ON | ON |
| S2 (Z2) | Presence 2 | OFF | ON | ON | ON |
| S3 (Z3) | Presence 3 | OFF | ON | ON | ON |
| S4 (Z4) | Presence 4 | OFF | ON | ON | ON |
| S7 (Z7) | Vertical 1 | OFF | ON | ON | ON |
| S8 (Z8) | Vertical 2 | OFF | ON | ON | ON |

Fig 4C

Operational states of entrance system 410 (480)

| Sensor | Type | Closed | Opening | Open | Closing | Closed | Opening | Open | Closing | |
|---|---|---|---|---|---|---|---|---|---|---|
| S5 (Z5) | Inner | ON | OFF | ON | ON | ON | OFF | ON | ON | |
| S6 (Z6) | Outer | ON | OFF | ON | ON | OFF | OFF | OFF | OFF | OFF |
| S3 (Z3) | Presence 1 | OFF | OFF | OFF | ON | OFF | OFF | OFF | ON | OFF |
| S4 (Z4) | Presence 2 | OFF | OFF | OFF | OFF | OFF | ON | OFF | ON | OFF |
| S1 (Z1) | Side 1 | OFF | ON | OFF | OFF | OFF | ON | OFF | OFF | OFF |
| S2 (Z2) | Side 2 | OFF | ON | OFF | OFF | OFF | ON | OFF | OFF | OFF |
| Operational Mode -> | | AUTO, AUTO PARTIAL | | | | EXIT | | | | OFF |

Fig 5C

Operational states of entrance system 510 (580)

| Type | Closed | Opening | Open | Closing | Closed | Opening | Open | Closing | |
|---|---|---|---|---|---|---|---|---|---|
| Inner Z3 | ON | OFF | ON | ON | ON | OFF | ON | ON | |
| Outer Z4 | ON | OFF | ON | ON | OFF | OFF | OFF | OFF | OFF |
| Presence 1 Z1 | OFF | ON | OFF | OFF | OFF | ON | OFF | OFF | OFF |
| Presence 2 Z2 | OFF | OFF | OFF | ON | OFF | OFF | OFF | ON | OFF |
| Operational Mode -> | Auto | | | | EXIT | | | | OFF, OPEN |

Operational states of entrance system 610

| Sensor | Type | No rotation | Start rotation | Rotation | End rotation | No rotation | Start rotation | Rotation | End rotation | No rotation |
|---|---|---|---|---|---|---|---|---|---|---|
| S5 (Z5) | Inner | ON | OFF | OFF | ON | ON | OFF | OFF | ON | OFF |
| S6 (Z6) | Outer | ON | OFF | OFF | ON | OFF | OFF | OFF | OFF | OFF |
| S1 (Z1) | Presence 1 | OFF | ON | ON | ON | OFF | ON | ON | ON | OFF |
| S2 (Z2) | Presence 2 | OFF | ON | ON | ON | OFF | ON | ON | ON | OFF |
| S3 (Z3) | Presence 3 | OFF | ON | ON | ON | OFF | ON | ON | ON | OFF |
| S4 (Z4) | Presence 4 | OFF | ON | ON | ON | OFF | ON | ON | ON | OFF |
| S7 (Z7) | Vertical 1 | OFF | ON | ON | ON | OFF | ON | ON | ON | OFF |
| S8 (Z8) | Vertical 2 | OFF | ON | ON | ON | OFF | ON | ON | ON | OFF |

Operating Mode -> Automatic Operation | Automatic Exit only | Lock Door, Manual operation, Summer position

CONTROL ARRANGEMENT FOR AN ENTRANCE SYSTEM HAVING ONE OR MORE MOVABLE DOOR MEMBERS

This application is a 371 of PCT/EP2018/058814 filed on Apr. 6, 2018, published on Oct. 18, 2018 under publication number WO 2018/189042, which claims priority benefits from Swedish Patent Application No. 1730102-9 filed on Apr. 10, 2017, the disclosure of which is incorporated herein by reference.

TECHNICAL FIELD

The present invention relates to the technical field of entrance systems having one or more movable door members. More specifically, the present invention relates to a control arrangement for an entrance system having one or more movable door members and an automatic door operator for causing movements of the one or more movable door members between closed and open positions. The present invention also relates to an entrance system comprising such a control arrangement, and to a method of operating such an entrance system.

BACKGROUND

Entrance systems having automatic door operators are frequently used for providing automatic opening and closing of one or more movable door members in order to facilitate entrance and exit to buildings, rooms and other areas. The door members may for instance be swing doors, sliding door or revolving doors.

Since entrance systems having automatic door operators are typically used in public areas, user convenience is of course important. The entrance systems need to remain long-term operational without malfunctions even during periods of heavy traffic by persons passing through the entrance systems. At the same time, safety is crucial in order to avoid hazardous situations where a present, approaching or departing person or object (including but not limited to animals or articles brought by the person) may be hit or jammed by any of the movable door members.

The present inventor has realized that there is room for improvements in this field.

SUMMARY

An object of the present invention is therefore to provide one or more improvements in the field of entrance systems having automatic door operators for causing movements of one or more movable door members between closed and open positions.

The present inventor has realized, after insightful consideration, that in order to satisfy the relevant requirements in terms of user convenience, it will be necessary to use a plurality of sensors for monitoring different zones at the entrance system for presence or activity of a person or object. The present inventor has realized that while this implies a penalty in electric power consumption, the situation can be improved by appropriately configuring the entrance system such that the different sensors are selectively controlled to be active or inactive depending on the operational state of the entrance system.

Accordingly, a first aspect of the present invention is a control arrangement for an entrance system having one or more movable door members and an automatic door operator for causing movements of the one or more movable door members between closed and open positions. The control arrangement comprises a controller and a plurality of sensors. Each sensor is connected to the controller and is configured to monitor a respective zone at the entrance system for presence or activity of a person or object. Moreover, each sensor has an active mode and an inactive mode, wherein the sensor consumes no electric power in the inactive mode or substantially less electric power in the inactive mode than in the active mode.

The controller is configured to determine a current operational state of the entrance system among a plurality of possible operational states, and selectively cause at least one of the sensors to be in its active mode or in its inactive mode depending on the determined current operational state of the entrance system.

The provision of such a control arrangement will solve or at least mitigate one or more of the problems or drawbacks identified in the above, as will be clear from the following detailed description section and the drawings.

A second aspect of the present invention is an entrance system comprising one or more movable door members, an automatic door operator for causing movements of the one or more movable door members between closed and open positions, and a control arrangement according to the first aspect of the present invention.

A third aspect of the present invention is a method of operating an entrance system having one or more movable door members and an automatic door operator for causing movements of the one or more movable door members between closed and open positions. The method comprises providing a plurality of sensors, each sensor being configured to monitor a respective zone at the entrance system for presence or activity of a person or object. The method also comprises determining a current operational state of the entrance system among a plurality of possible operational states. The method then comprises selectively causing at least one of the sensors to be in an active mode or in an inactive mode depending on the determined current operational state of the entrance system, wherein the sensor consumes no electric power in the inactive mode or substantially less electric power in the inactive mode than in the active mode.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings.

FIG. 3 is a flowchart diagram illustrating a method of operating an entrance system generally according to the present invention.

FIGS. 4C, 5C and 6C illustrate tables containing expanded control data used in refined versions of the embodiments in FIGS. 4A, 5A and 6A.

DETAILED DESCRIPTION OF EMBODIMENTS

Figure 1:
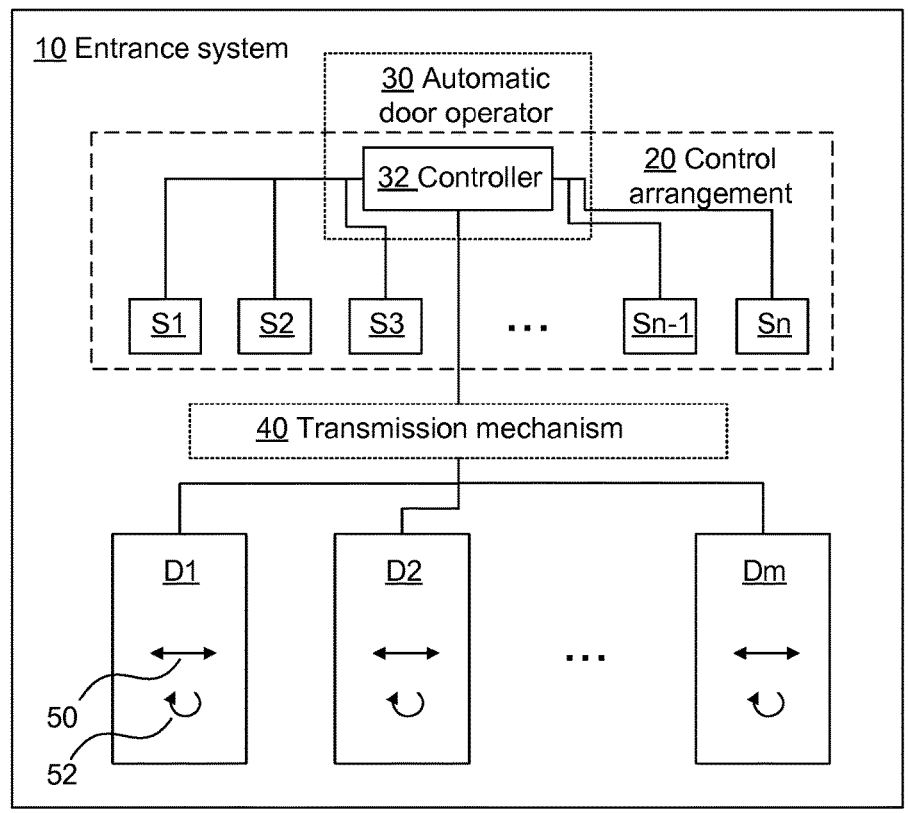
FIG. 1 is a schematic block diagram of an entrance system generally according to the present invention.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Figure 2:
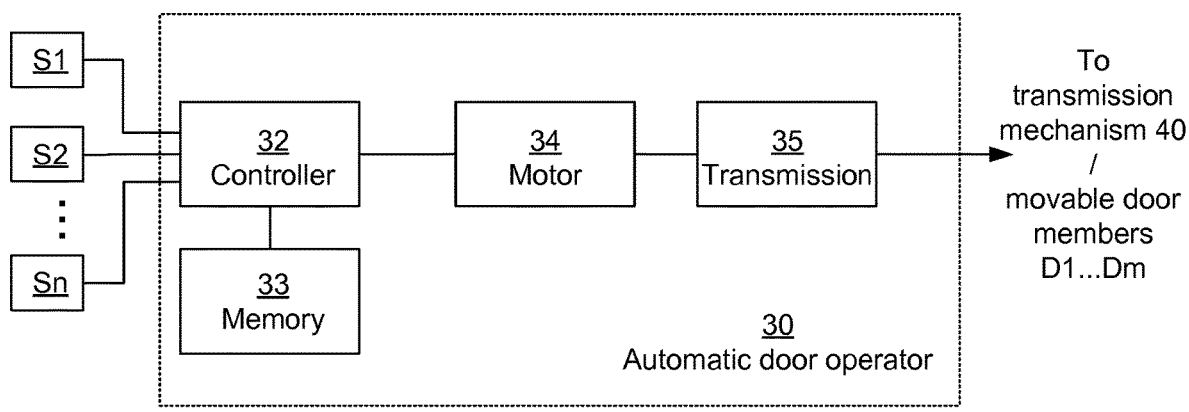
FIG. 2 is a schematic block diagram of an automatic door operator which may be included in the entrance system shown in FIG. 1.

FIG. 1 is a schematic block diagram illustrating an entrance system 10 in which the inventive aspect of the present invention may be applied. The entrance system 10 comprises one or more movable door members D1 . . . Dm, and an automatic door operator 30 for causing movements of the door members D1 . . . Dm between closed and open positions. In FIG. 1, a transmission mechanism 40 conveys mechanical power from the automatic door operator 30 to the movable door members D1 . . . Dm. FIG. 2 illustrates one embodiment of the automatic door operator 30 in more detail.

Pursuant to the invention, a control arrangement 20 is provided for the entrance system 10. The control arrangement 20 comprises a controller 32, which may be part of the automatic door operator 30 as seen in the embodiment of FIG. 2, but which may be a separate device in other embodiments. The control arrangement 20 also comprises a plurality of sensors S1 . . . Sn. Each sensor is connected to the controller 32 by wired connections, wireless connections, or any combination thereof. As will be exemplified in the subsequent description of the three different embodiments in FIGS. 4A, 5A and 6A, each sensor is configured to monitor a respective zone Z1 . . . Zn at the entrance system 10 for presence or activity of a person or object. The person may be an individual who is present at the entrance system 10, is approaching it or is departing from it. The object may, for instance, be an animal or an article in the vicinity of the entrance system 10, for instance brought by the aforementioned individual.

Pursuant to the invention, each sensor S1 . . . Sn has an active mode and an inactive mode, wherein the sensor consumes some electric power in the active mode but no electric power in the inactive mode, or at least substantially less electric power in the inactive mode than in the active mode. The active mode may be an operating mode, i.e. a mode where the sensor is (fully) operational in terms of its sensing functionality and hence capable of performing its monitoring of the zone in question. In contrast, the inactive mode may be an idle mode, standby mode, disconnected more or shut-off mode, i.e. a mode where the sensor is not operational in terms of its sensing functionality and hence incapable of performing its monitoring of the zone in question.

The controller 32 is configured to determine a current operational state of the entrance system 10 among a plurality of possible operational states. This determination may be made on a regular basis, for instance based on a schedule. Alternatively or additionally, this determination may be occasioned by the controller 32 itself when switching states in the internal program run by the controller as being part of, for instance, the functionality performed by the automatic door operator 30.

The controller 32 is moreover configured to selectively cause at least one of the sensors S1 . . . Sn to be in its active mode or in its inactive mode depending on the determined current operational state of the entrance system 10. Examples of such selective causing of mode switches for the different sensors S1 . . . Sn will be given later when describing the three embodiments of FIGS. 4A, 4B and 4C.

The embodiment of the automatic door operator 30 shown in FIG. 2 will now be described in more detail. The automatic door operator 30 may typically be arranged in conjunction with a frame or other structure which supports the door members D1 . . . Dm for movements between closed and open positions, often as a concealed overhead installation in or at the frame or support structure.

In addition to the aforementioned controller 32, the automatic door operator 30 comprises a motor 34, typically an electrical motor, being connected to an internal transmission or gearbox 35. An output shaft of the transmission 35 rotates upon activation of the motor 34 and is connected to the external transmission mechanism 40. The external transmission mechanism translates the motion of the output shaft of the transmission 35 into an opening or a closing motion of one or more of the door members D1 . . . Dm with respect to the frame or support structure.

The controller 32 is configured for performing different functions of the automatic door operator 30 in the different operational states of the entrance system 10, using inter alia sensor input data from the plurality of sensors S1 . . . Sn. Hence, the outputs of the plurality of sensors S1 . . . Sn are connected to data inputs of the controller 32. At least some of the different functions performable by the controller 32 have the purpose of causing desired movements of the door members D1 . . . Dm. To this end, the controller 32 has at least one control output connected to the motor 34 for controlling the actuation thereof.

The controller 32 may be implemented in any known controller technology, including but not limited to microcontroller, processor (e.g. PLC, CPU, DSP), FPGA, ASIC or any other suitable digital and/or analog circuitry capable of performing the intended functionality.

The controller 32 also has an associated memory 33. The memory 33 may be implemented in any known memory technology, including but not limited to E(E)PROM, S(D) RAM or flash memory. In some embodiments, the memory 33 may be integrated with or internal to the controller 32. The memory 33 may store program instruction for execution by the controller 32, as well as temporary and permanent data used by the controller 32.

Before turning to a detailed description of the three different embodiments, reference is made to FIG. 3 which illustrates a method of operating an entrance system involving the inventive functionality described above.

Hence, in a first step 310, the plurality of sensors S1 . . . Sn are provided. As mentioned above, each sensor is configured to monitor a respective zone Z1 . . . Zn at the entrance system 10 for presence or activity of a person or object.

Then, in a second step 320, a current operational state of the entrance system 10 is determined among a plurality of possible operational states.

A third step 330 involves selectively causing at least one of the sensors S1 . . . Sn to be in an active mode or in an inactive mode depending on the determined current operational state of the entrance system 10, wherein the sensor consumes no electric power in the inactive mode or substantially less electric power in the inactive mode than in the active mode.

As already touched upon above and as is seen in FIG. 3, the steps 320 and 330 will be repeated as appropriate.

Figures 4A, 4B:
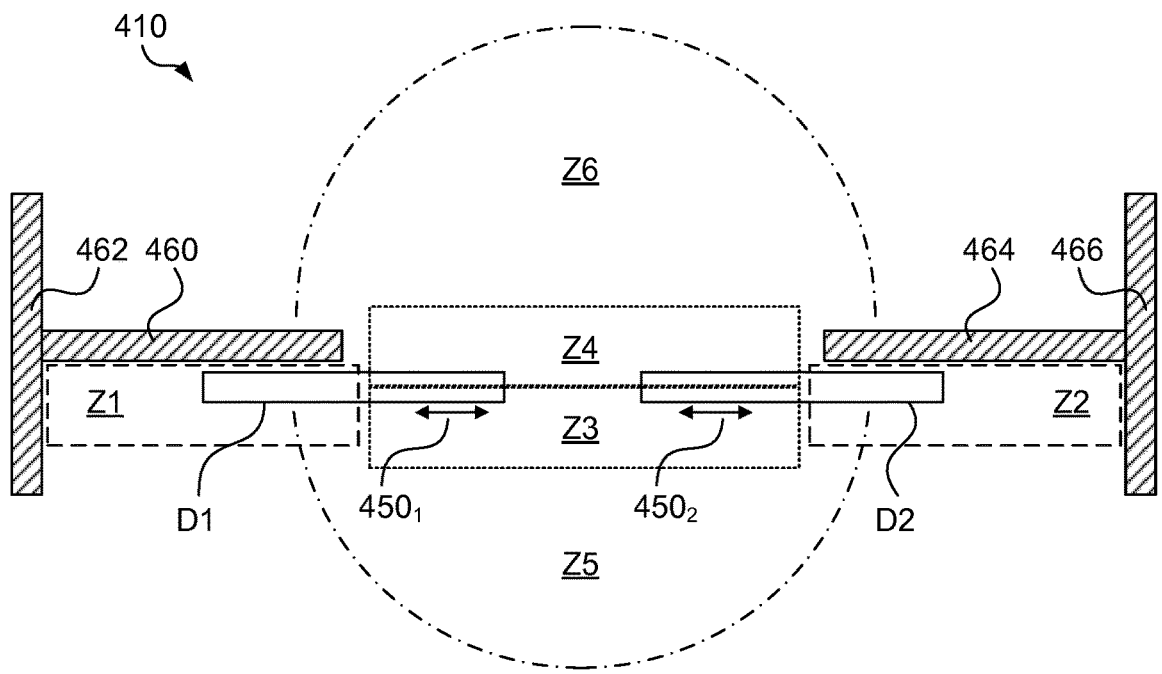
FIG. 4A is a schematic top view of an entrance system according to a first embodiment, in the form of a sliding door system.
FIG. 4B illustrates a table containing control data which may be used by the method shown in FIG. 3 for operating the entrance system shown in FIG. 4A.

Turning now to FIG. 4A, a first embodiment of an entrance system in the form of a sliding door system 410 is shown in a schematic top view. The sliding door system 410 comprises first and second sliding doors or wings D1 and D2, being supported for sliding movements 4501 and 4502 in parallel with first and second wall portions 460 and 464. The first and second wall portions 460 and 464 are spaced apart; in between them there is formed an opening which the sliding doors D1 and D2 either blocks (when the sliding doors are in closed positions), or makes accessible for passage (when the sliding doors are in open positions). An automatic door operator (not seen in FIG. 4A but referred to as 30 in FIGS. 1 and 2) causes the movements 4501 and 4502 of the sliding doors D1 and D2.

The sliding door system 410 comprises a plurality of sensors, each monitoring a respective zone Z1-Z6. The sensors themselves are not shown in FIG. 4A, but they are generally mounted at or near ceiling level and/or at positions which allow them to monitor their respective zones Z1-Z6. To facilitate the reading, each sensor will be referred to as Sx in the following, where x is the same number as in the zone Zx it monitors (Sx=S1-S6, Zx=Z1-Z6).

A first sensor S1 is mounted at a lateral positon to the far left in FIG. 4A to monitor zone Z1. The first sensor S1 is a side presence sensor, and the purpose is to detect when a person or object occupies a space between the outer lateral edge of the sliding door D1 and an inner surface of a wall or other structure 462 when the sliding door D1 is moved towards the left in FIG. 4A during an opening state of the sliding door system 410. The provision of the side presence sensor S1 will help avoiding a risk that the person or object will be hit by the outer lateral edge of the sliding door D1, and/or jammed between the outer lateral edge of the sliding door D1 and the inner surface of the wall 462, by triggering abort and preferably reversal of the ongoing opening movement of the sliding door D1.

A second sensor S2 is mounted at a lateral positon to the far right in FIG. 4A to monitor zone Z2. The second sensor S2 is a side presence sensor, just like the first sensor S1, and has the corresponding purpose i.e. to detect when a person or object occupies a space between the outer lateral edge of the sliding door D2 and an inner surface of a wall 466 when the sliding door D2 is moved towards the right in FIG. 4A during the opening state of the sliding door system 410.

A third sensor S3 is mounted at a first central positon in FIG. 4A to monitor zone Z3. The third sensor S3 is a door presence sensor, and the purpose is to detect when a person or object occupies a space between or near the inner lateral edges of the sliding doors D1 and D2 when the sliding doors D1 are moved towards each other in FIG. 4A during a closing state of the sliding door system 410. The provision of the door presence sensor S3 will help avoiding a risk that the person or object will be hit by the inner lateral edge of the sliding door D1 or D2, and/or be jammed between the inner lateral edges of the sliding doors D1 and D2, by aborting and preferably reversing the ongoing closing movements of the sliding doors D1 and D2.

A fourth sensor S4 is mounted at a second central positon in FIG. 4A to monitor zone Z4. The fourth sensor S4 is a door presence sensor, just like the third sensor S3, and has the corresponding purpose i.e. to detect when a person or object occupies a space between or near the inner lateral edges of the sliding doors D1 and D2 when the sliding doors D1 are moved towards each other in FIG. 4A during a closing state of the sliding door system 410.

The side presence sensors S1 and S2 and door presence sensors S3 and S4 may for instance be active IR (infrared) sensors.

A fifth sensor S5 is mounted at an inner central positon in FIG. 4A to monitor zone Z5. The fifth sensor S5 is an inner activity sensor, and the purpose is to detect when a person or object approaches the sliding door system 410 from the inside of the premises. The provision of the inner activity sensor S5 will trigger the sliding door system 410, when being in a closed state or a closing state, to automatically switch to an opening state for opening the sliding doors D1 and D2, and then make another switch to an open state when the sliding doors D1 and D2 have reached their fully open positions.

A sixth sensor S6 is mounted at an outer central positon in FIG. 4A to monitor zone Z6. The sixth sensor S6 is an outer activity sensor, and the purpose is to detect when a person or object approaches the sliding door system 410 from the outside of the premises. Similar to the inner activity sensor S5, the provision of the outer activity sensor S6 will trigger the sliding door system 410, when being in its closed state or its closing state, to automatically switch to the opening state for opening the sliding doors D1 and D2, and then make another switch to an open state when the sliding doors D1 and D2 have reached their fully open positions.

The inner activity sensor S5 and the outer activity sensor S6 may for instance be radar (microwave) sensors.

Pursuant to the inventive aspects previously described, a control arrangement is provided for the sliding door system 410 (cf control arrangement 20 and entrance system 10 in FIGS. 1 and 2). The control arrangement for the embodiment in FIG. 4A comprises a controller (such as the controller of the automatic door operator, cf controller 30 in FIGS. 1 and 2) and the plurality of sensors S1-S6. As is seen in FIG. 4B, the control arrangement has been configured by control data 480. The control data defines for each sensor S1-S6 (zones Z1-Z6) and for each operational state of the sliding door system 410 whether the respective sensor shall be in its active state ("ON") or its inactive state ("OFF"). The controller will use the control data 480 when exercising the selective control of the sensors S1-S6 in step 330 of FIG. 3.

As can be seen in the control data 480, only the inner activity sensor S5 and the outer activity sensor S6 will be active when the sliding door system 410 is in its closed state. Since the sliding doors D1 and D2 are closed, there will be no risk of persons or objects being hit by or jammed between them, and accordingly the controller puts the side presence sensors S1 and S2 and the door presence sensors S3 and S4 in their inactive mode in the closed state of the sliding door system 410. This will save power.

The similar situation prevails when the sliding door system 410 is in its open state; only the inner activity sensor S5 and the outer activity sensor S6 will be active. Since the sliding doors D1 and D2 are not moving, the side presence sensors S1 and S2 and the door presence sensors S3 and S4 can be held in their inactive mode in the open state of the sliding door system 410; again this will preserve power.

The situation is different when the sliding doors D1 and D2 are moving, i.e. when the sliding door system 410 is in its opening state or its closing state. Here, different ones among the sensors S1-S6 will be kept active and inactive, respectively, as defined by the control data 480.

In the opening state, the inner activity sensor S5, the outer activity sensor S6 as well as the door presence sensors S3 and S4 can all be kept inactive. This is so since the sliding doors D1 and D2 are already opening; hence there is no need for the inner activity sensor S5 or outer activity sensor S6 during the opening state of the sliding door system 410. Also, since the sliding doors D1 and D2 are opening, i.e. moving away from each other, there is no risk for a hitting or jamming accident in the central zones Z3 and Z4; hence there is no need for the door presence sensors S3 and S4 during the opening state of the sliding door system 410. Hence, power can be preserved by only keeping the side presence sensors S1 and S2 active for monitoring the lateral zones Z1 and Z2.

In the closing state, the inner activity sensor S5, the outer activity sensor S6 as well as the door presence sensors S3 and S4 will all have to be active, since the zones Z5, Z6, Z3 and Z4 will have to be monitored. On the other hand, since the sliding doors D1 and D2 are moving towards each other they are also moving away from the lateral zones Z1 and Z2; hence these zones do not need monitoring during the closing state of the sliding door system 410, and the side presence sensors S1 and S2 may be kept inactive to save power.

Figures 5A, 5B:
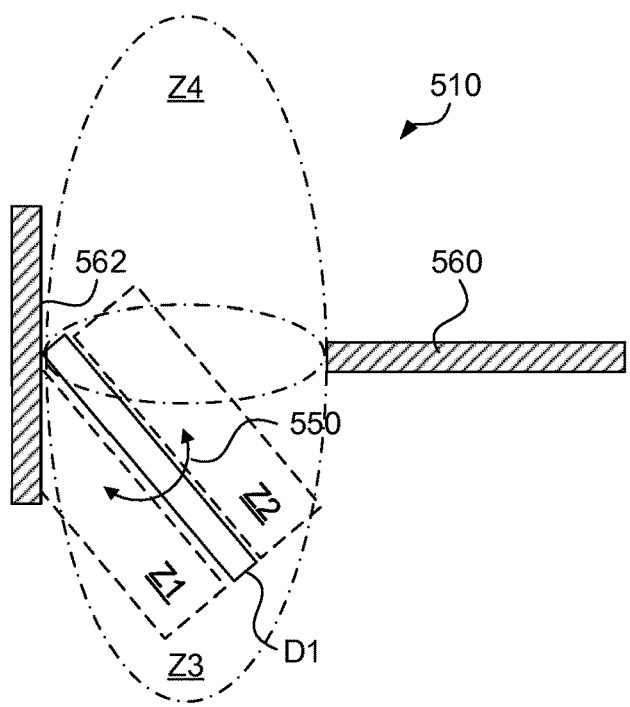
FIG. 5A is a schematic top view of an entrance system according to a second embodiment, in the form of a swing door system.
FIG. 5B illustrates a table containing control data which may be used by the method shown in FIG. 3 for operating the entrance system shown in FIG. 5A.

A second embodiment of an entrance system in the form of a swing door system 510 is shown in a schematic top view in FIG. 5A. The swing door system 510 comprises a single swing door D1 being located between a lateral edge of a first wall 560 and an inner surface of a second wall 562 which is perpendicular to the first wall 560. The swing door D1 is supported for pivotal movement 550 around pivot points on or near the inner surface of the second wall 562. The first and second walls 560 and 562 are spaced apart; in between them an opening is formed which the swing door D1 either blocks (when the swing door is in closed position), or makes accessible for passage (when the swing door is in open position). An automatic door operator (not seen in FIG. 5A but referred to as 30 in FIGS. 1 and 2) causes the movement 550 of the swing door D1.

The swing door system 510 comprises a plurality of sensors, each monitoring a respective zone Z1-Z4. The sensors themselves are not shown in FIG. 5A, but they are generally mounted at or near ceiling level and/or at positions which allow them to monitor their respective zones Z1-Z4. Again, each sensor will be referred to as Sx in the following, where x is the same number as in the zone Zx it monitors (Sx=S1-S4, Zx=Z1-Z4).

A first sensor S1 is mounted at a first central positon in FIG. 5A to monitor zone Z1. The first sensor S1 is a door presence sensor, and the purpose is to detect when a person or object occupies a space near a first side of the (door leaf of the) swing door D1 when the swing door D1 is being moved towards the open position during an opening state of the swing door system 510. The provision of the door presence sensor S1 will help avoiding a risk that the person or object will be hit by the first side of the swing door D1 and/or be jammed between the first side of the swing door D1 and the second wall 562; a sensor detection in this situation will trigger abort and preferably reversal of the ongoing opening movement of the swing door D1.

A second sensor S2 is mounted at a second central positon in FIG. 5A to monitor zone Z2. The second sensor S2 is a door presence sensor, just like the first sensor S1, and has the corresponding purpose i.e. to detect when a person or object occupies a space near a second side of the swing door D1 (the opposite side of the door leaf of the swing door D1) when the swing door D1 is being moved towards the closed position during a closing state of the swing door system 510. Hence, the provision of the door presence sensor S2 will help avoiding a risk that the person or object will be hit by the second side of the swing door D1 and/or be jammed between the second side of the swing door D1 and the first wall 560; a sensor detection in this situation will trigger abort and preferably reversal of the ongoing closing movement of the swing door D1.

The door presence sensors S1 and S2 may for instance be active IR (infrared) sensors.

A third sensor S3 is mounted at an inner central positon in FIG. 5A to monitor zone Z3. The third sensor S3 is an inner activity sensor, and the purpose is to detect when a person or object approaches the swing door system 510 from the inside of the premises. The provision of the inner activity sensor S3 will trigger the sliding door system 510, when being in a closed state or a closing state, to automatically switch to an opening state for opening the swing door D1, and then make another switch to an open state when the swing door D1 has reached its fully open position.

A fourth sensor S4 is mounted at an outer central positon in FIG. 5A to monitor zone Z4. The fourth sensor S4 is an outer activity sensor, and the purpose is to detect when a person or object approaches the swing door system 510 from the outside of the premises. Similar to the inner activity sensor S3, the provision of the outer activity sensor S4 will trigger the swing door system 510, when being in its closed state or its closing state, to automatically switch to the opening state for opening the swing door D1, and then make another switch to an open state when the swing door D1 has reached its fully open position.

The inner activity sensor S3 and the outer activity sensor S4 may for instance be radar (microwave) sensors.

Pursuant to the inventive aspects previously described and similar to the first embodiment in FIG. 4A, a control arrangement is provided for the swing door system 510 in FIG. 5A (cf control arrangement 20 and entrance system 10 in FIGS. 1 and 2). The control arrangement for the embodiment in FIG. 5A comprises a controller (such as the controller of the automatic door operator, cf controller 30 in FIGS. 1 and 2) and the plurality of sensors S1-S4. As is seen in FIG. 5B, the control arrangement has been configured by control data 580. The control data defines for each sensor S1-S4 (zones Z1-Z4) and for each operational state of the swing door system 510 whether the respective sensor shall be in its active state ("ON") or its inactive state ("OFF"). The controller will use the control data 580 when exercising the selective control of the sensors S1-S4 in step 330 of FIG. 3.

As can be seen in the control data 580, only the inner activity sensor S3 and the outer activity sensor S4 will be active when the swing door system 510 is in its closed state. Since the swing door D1 is closed, there will be no risk of persons or objects being hit by or jammed by it, and accordingly the controller puts the door presence sensors S1 and S2 in their inactive mode in the closed state of the swing door system 510. This will save power.

The similar situation prevails when the swing door system 510 is in its open state; only the inner activity sensor S5 and the outer activity sensor S6 will be active. Since the swing door D1 is not moving, the door presence sensors S1 and S2 can be held in their inactive mode in the open state of the swing door system 510; again this will preserve power.

The situation is different when the swing door D1 is moving, i.e. when the swing door system 510 is in its opening state or its closing state. Here, different ones among the sensors S1-S4 will be kept active and inactive, respectively, as defined by the control data 580.

In the opening state, the inner activity sensor S3, the outer activity sensor S4 as well as the door presence sensor S2 can all be kept inactive. This is so since the swing door D1 is already opening, there is no risk for a hitting or jamming accident in the central zone Z2; hence there is no need for the door presence sensors S1 and S2 during the opening state of the swing door system 510. Hence, power can be preserved by only keeping three of the sensors S1-S4 inactive during the opening state of the swing door system 510, and only keeping sensor S1 active to monitor zone Z1.

In the closing state, the inner activity sensor S3, the outer activity sensor S4 as well as at least the door presence sensor S2 will all have to be active, since the zones Z3, Z4 and Z1 will have to be monitored. Sensor S1 may be kept inactive to save power.

Figures 6A, 6B:
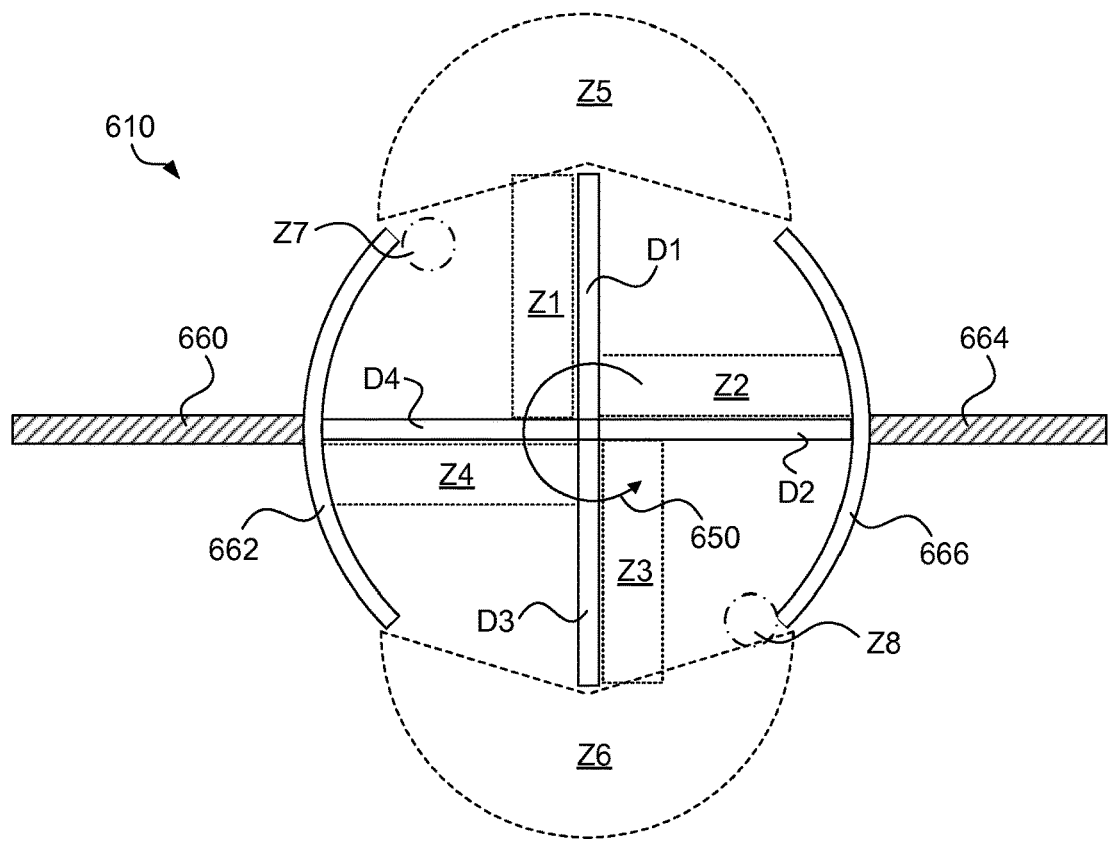
FIG. 6A is a schematic top view of an entrance system according to a third embodiment, in the form of a revolving door system.
FIG. 6B illustrates a table containing control data which may be used by the method shown in FIG. 3 for operating the entrance system shown in FIG. 6A.

A third embodiment of an entrance system in the form of a revolving door system 610 is shown in a schematic top view in FIG. 6A. The revolving door system 610 comprises a plurality of revolving doors or wings D1-D4 being located in a cross configuration in an essentially cylindrical space between first and second curved wall portions 662 and 666 which, in turn, are spaced apart and located between third and fourth wall portions 660 and 664. The revolving doors D1-D4 are supported for rotational movement 650 in the cylindrical space between the first and second curved wall portions 662 and 666. During the rotation of the revolving doors D1-D4, they will alternatingly prevent and allow passage through the cylindrical space. An automatic door operator (not seen in FIG. 6A but referred to as 30 in FIGS. 1 and 2) causes the rotational movement 650 of the revolving doors D1-D4.

The revolving door system 610 comprises a plurality of sensors, each monitoring a respective zone Z1-Z8. The sensors themselves are not shown in FIG. 6A, but they are generally mounted at or near ceiling level and/or at positions which allow them to monitor their respective zones Z1-Z8. Again, each sensor will be referred to as Sx in the following, where x is the same number as in the zone Zx it monitors (Sx=S1-S8, Zx=Z1-Z8).

First to fourth sensors S1-S4 are mounted at respective first to fourth central positons in FIG. 6A to monitor zones Z1-Z4. The first to fourth sensors S1-S4 are door presence sensors, and the purpose is to detect when a person or object occupies a respective space (sub-zone of Z1-Z4) near one side of the (door leaf of the) respective revolving door D1-D4 as it is being rotationally moved during a rotation state or start rotation state of the revolving door system 610. The provision of the door presence sensors S1-S4 will help avoiding a risk that the person or object will be hit by the approaching side of the respective revolving door D1-D4 and/or be jammed between the approaching side of the respective revolving door D1-D4 and end portions of the first or second curved wall portions 662 and 666. When any of the door presence sensors S1-S4 detects such a situation, it will trigger abort and possibly reversal of the ongoing rotational movement 650 of the revolving doors D1-D4.

The door presence sensors S1-S4 may for instance be active IR (infrared) sensors.

A fifth sensor S5 is mounted at an inner non-central positon in FIG. 6A to monitor zone Z5. The fifth sensor S5 is an inner activity sensor, and the purpose is to detect when a person or object approaches the revolving door system 610 from the inside of the premises. The provision of the inner activity sensor S5 will trigger the revolving door system 610, when being in a no rotation state or an end rotation state, to automatically switch to a start rotation state to begin rotating the revolving doors D1-D4, and then make another switch to a rotation state when the revolving doors D1-D4 have reached full rotational speed.

A sixth sensor S6 is mounted at an outer non-central positon in FIG. 6A to monitor zone Z6. The sixth sensor S6 is an outer activity sensor, and the purpose is to detect when a person or object approaches the revolving door system 610 from the outside of the premises. Similar to the inner activity sensor S5, the provision of the outer activity sensor S6 will trigger the revolving door system 610, when being in its no rotation state or end rotation state, to automatically switch to the start rotation state to begin rotating the revolving doors D1-D4, and then make another switch to the rotation state when the revolving doors D1-D4 have reached full rotational speed.

The inner activity sensor S5 and the outer activity sensor S6 may for instance be radar (microwave) sensors.

Seventh and eighth sensors S7 and S8 are mounted near the ends of the first or second curved wall portions 662 and 666 to monitor zones Z7 and Z8. The seventh and eighth sensors S7 and S8 are vertical presence sensors. The provision of these sensors S7 and S8 will help avoiding a risk that the person or object will be jammed between the approaching side of the respective revolving door D1-D4 and an end portion of the first or second curved wall portions 662 and 666 during the start rotation state and the rotation state of the revolving door system 610. When any of the vertical presence sensors S7-S8 detects such a situation, it will trigger abort and possibly reversal of the ongoing rotational movement 650 of the revolving doors D1-D4.

The vertical presence sensors S7-S8 may for instance be active IR (infrared) sensors.

Pursuant to the inventive aspects previously described and similar to the first and second embodiments in FIGS. 4A and 5A, a control arrangement is provided for the revolving door system 610 in FIG. 6A (cf control arrangement 20 and entrance system 10 in FIGS. 1 and 2). The control arrangement for the embodiment in FIG. 6A comprises a controller (such as the controller of the automatic door operator, cf controller 30 in FIGS. 1 and 2) and the plurality of sensors S1-S8. As is seen in FIG. 6B, the control arrangement has been configured by control data 680. The control data defines for each sensor S1-S8 (zones Z1-Z8) and for each operational state of the revolving door system 610 whether the respective sensor shall be in its active state ("ON") or its inactive state ("OFF"). The controller will use the control data 680 when exercising the selective control of the sensors S1-S8 in step 330 of FIG. 3.

As can be seen in the control data 680, only the inner activity sensor S5 and the outer activity sensor S6 will be active when the revolving door system 610 is in its no rotation state. Since the revolving doors D1-D4 are not moving, there will be no risk of persons or objects being hit or jammed by them, and accordingly the controller puts the door presence sensors S1-S4 as well as the vertical presence sensors S7-S8 in their inactive mode in the no rotation state of the revolving door system 610. This will save power.

The opposite situation applies during the start rotation state and the rotation state of the revolving door system 610. Here, since the revolving doors D1-D4 are already moving, there is no need to use the inner activity sensor S5 and the outer activity sensor S6; hence they will be kept in their inactive mode to preserve power. The door presence sensors S1-S4 will need to monitor their zones Z1-Z4 and are hence in their active mode.

Likewise, the vertical presence sensors S7-S8 will be in their active mode in the start rotation state and the rotation state of the revolving door system 610. A possible further power preservation in however possible by configuring the controller to intermittently switch the vertical presence sensors S7-S8 on and off during parts of the start rotation state and rotation state of the revolving door system 610 (as well as in the end rotation state of the revolving door system 610). When the revolving doors D1-D4 are near the first and second curved wall portions 662 and 666, the controller may switch the vertical presence sensors S7-S8 on, whereas when the revolving doors D1-D4 are remote from the first and second curved wall portions 662 and 666, the controller may switch the vertical presence sensors S7-S8 off.

Only in the end rotation state of the revolving door system 610, all sensors S1-S8 will have to be in their active mode. Hence, in three out of four operational states of the revolving door system 610, selected ones of the sensors S1-S8 will be in their inactive state to preserve power. It is to be noticed that the rotation and no rotation states typically have much longer durations than the intermittent start rotation and end rotation states; hence substantial power savings may be available by keeping selected ones of the sensors S1-S8 inactive during these longer durations.

The entrance system 10, 410, 510, 610 in any of the embodiments described above may have different main operating modes (operational modes), wherein further power may be saved. The operating modes represent a higher control layer of the entrance system; each operating mode may have a single operational state or a plurality of operational states. A human operator may set the current operating mode on an operator panel which is provided at the entrance system. Alternatively, a human operator may set the current operating mode wirelessly by using a portable computer, tablet computer or smartphone to communicate with the controller over a suitable wireless interface, or remotely by using a computer to communicate with the controller over a data network. Other ways of setting the current operating mode may also exist.

A first such operating mode may be automatic operation (Automatic Operation; Auto; Auto Partial), in which the entrance system 10, 410, 510, 610 is automatically operated in the different operational states as described above, and in which the different sensors S1 . . . Sn are selectively controlled to be active or inactive as described in this document, thereby achieving power preservation.

A second operating mode may be Exit (Automatic Exit Only), in which the entrance system 10, 410, 510, 610 is operated in a situation in which all people shall leave the premises where the entrance system is installed, for instance when a shopping mall closes for the day, or when an escape situation has occurred. In the Exit operating mode, at least the outer activity sensor S4; S6 may be kept inactive irrespective of operational state, since people approaching from the outside shall not allowed into the premises. Hence, additional power savings may be made.

A third operating mode may be Open, in which all the movable door members D1 . . . Dm take steady open positions not involving movements of the door members D1 . . . Dm by the automatic door operator. In the Open operating mode, all sensors S1 . . . Sn may be kept inactive. Similar operating modes, which do not involve movements of the door members D1 . . . Dm by the automatic door operator 30 and in which all sensors S1 . . . Sn may be kept inactive and thus save further power, may be Off, Lock Door, Manual Operation and Summer Position.

FIGS. 4C, 5C and 6C illustrate tables containing expanded control data 480, 580 and 680 which may be used in refined versions of the embodiments in FIGS. 4A, 5A and 6A, taking into account also the current operating mode of the respective entrance system 410, 510 and 610 as described above.

The invention has been described above in detail with reference to embodiments thereof. However, as is readily understood by those skilled in the art, other embodiments are equally possible within the scope of the present invention, as defined by the appended claims.

The invention claimed is:

1. An entrance system comprising:
   one or more movable door members comprising at least two sliding doors;
   an automatic door operator for causing movements of the one or more movable door members between closed and open positions; and
   a control arrangement comprising:
      a controller; and
      a plurality of sensors, each sensor being connected to the controller and being configured to monitor a respective zone near the one or more movable door members, wherein the plurality of sensors includes at least one activity sensor, wherein the at least one activity sensor, in a closed state or a closing state of the at least two sliding doors, detects when a person or object approaches the at least two sliding doors and triggers an opening state for opening the at least two sliding doors and at least one presence sensor, wherein the at least one presence sensor detects when a person or object occupies a space between or near the at least two sliding doors when being moved towards each other during a closing state, wherein each sensor has an active mode and an inactive mode, wherein each sensor consumes no electric power in the inactive mode or substantially less electric power in the inactive mode than in the active mode; and
   wherein the controller:
      determines a current operational state of the one or more movable door members among a plurality of operational states; and
      in response to the one or more movable door members being in an opening operational state, causes the at least one activity sensor and the at least one presence sensor to be in the inactive mode.

2. The entrance system as defined in claim 1, wherein the controller of the control arrangement is configured to:
- when the at least two sliding doors are in the closed state or an open state, cause the at least one activity sensor to be in the active mode and the at least one presence sensor to be in the inactive mode;
- when the at least two sliding doors are in the opening state, cause all of the at least one activity sensor and the at least one presence sensor to be in the inactive mode; and
- when the at least two sliding doors are in the closing state, cause all of the at least one activity sensor and the at least one presence sensor to be in the active mode.

3. The entrance system as defined in claim 1, wherein the control arrangement further comprises at least one side presence sensor for detecting, during the opening state of the at least two sliding doors, that a person or object occupies a space between an outer lateral edge of one of the sliding doors and an inner surface of a wall or other structure, and for triggering abort or reversal of an ongoing opening movement of the one of the sliding doors.

4. The entrance system as defined in claim 3, wherein the controller of the control arrangement further comprises:
- when the at least two sliding doors are in the closed state, the open state or the closing state, causes the at least one side presence sensor to be in the inactive mode; and
- when the at least two sliding doors are in the opening state, causes the at least one side presence sensor to be in the active mode.

5. The entrance system as defined in claim 1, having a plurality of different operating modes, each operating mode having a single operational state or a plurality of operational states, wherein:
- a first operating mode is an automatic operation of the entrance system by selectively controlling the plurality of sensors to be active or inactive; and
- a second operating mode is an exit operation of the entrance system in a situation in which all people leave a premises where the entrance system is installed, wherein the second operating mode involves selectively controlling the plurality of sensors to be active or inactive except for an outer activity sensor that is kept inactive irrespective of operational state.

6. The entrance system as defined in claim 5, wherein a third operating mode is an open operation that involves no movements of the door members by the automatic door operator, and wherein all sensors are kept inactive in the third operating mode.

* * * * *